United States Patent [19]

Gumb

[11] 4,154,990
[45] May 15, 1979

[54] TELEPHONE SET BASE MEMBER WITH BEAN BAG ATTACHMENT

[75] Inventor: Beverley W. Gumb, London, Canada

[73] Assignee: Northern Telecom Limited, Montreal, Canada

[21] Appl. No.: 884,284

[22] Filed: Mar. 7, 1978

[51] Int. Cl.² .............................................. H04M 1/11
[52] U.S. Cl. ................................................... 179/178
[58] Field of Search ................... 179/178, 179, 146 R, 179/146 H, 100 R, 100 D; 206/584; 224/29 R, 29 H, 29 G, 29 J, 29 K; 248/3

[56] References Cited

U.S. PATENT DOCUMENTS

Re. 26,034  6/1966  Nise et al. .................... 179/100 L
3,278,008  10/1966  Larkin .......................... 224/29 R Primary Examiner—Thomas W. Brown
Attorney, Agent, or Firm—Sidney T. Jelly

[57] ABSTRACT

A telephone set has a base member which is in the form of a flexible bag substantially filled with small pellets or similar material. The bag fits against the outside of the base of a substantially rigid housing with flaps on the bag extending up the outside of the housing and folding over and down the inside of the housing. Means are provided for attaching flaps to the housing. The assembled bag and housing fit over and enclose the telephone set base. The housing can have its sides divided into sections by slots to permit flexing of the sides as the housing is pushed onto the telephone set base.

9 Claims, 3 Drawing Figures

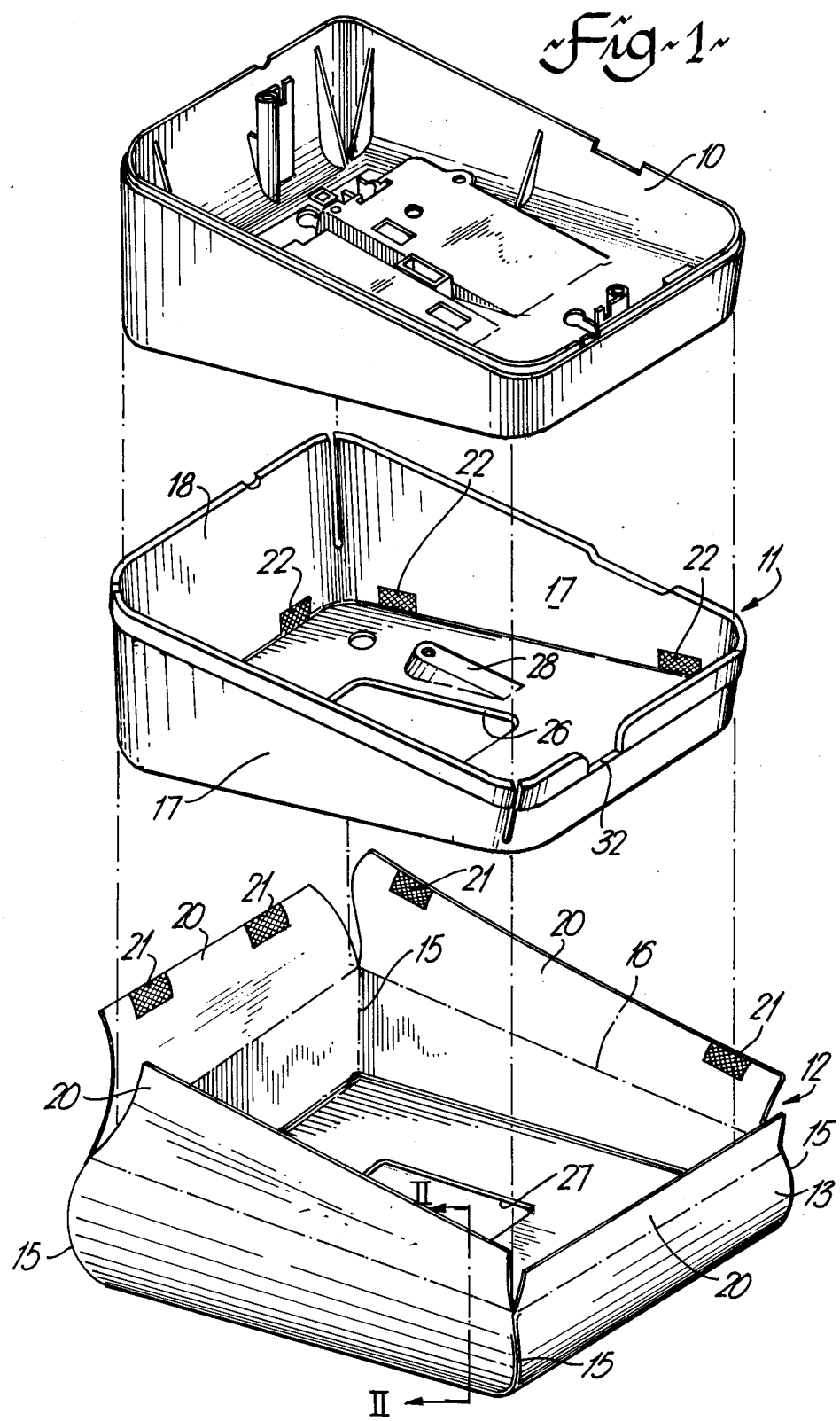

TELEPHONE SET BASE MEMBER WITH BEAN BAG ATTACHMENT

This invention relates to a base member for a telephone set, and to a telephone set incorporating such a base member. Particularly the base member comprises an enclosed flexible bag filled with small pellets and having extended flaps which fold over a substantially rigid housing into which the base of a telephone fits and is fastened thereto.

Conveniently the extended flaps fold over the sides of the housing down towards the bottom of the housing, being secured by interengagement of opposed pieces of hooked and looped material such as is sold under the Trade Mark "VELCRO". The general effect is to provide a "bean bag" attached to the telephone set which enables the telephone set to be put down on irregular surfaces without tipping and perhaps falling off.

The invention will be readily understood by the following description of an embodiment by way of example, in conjunction with the accompanying drawings, in which:

FIG. 1 is an exploded perspective view of a bag, housing and a telephone set base of one form of telephone set;

Illustrated in FIG. 1 is the telephone set base 10 and a housing 11 which receives the base 10 and to which is attached the bag 12.

Figure 2:
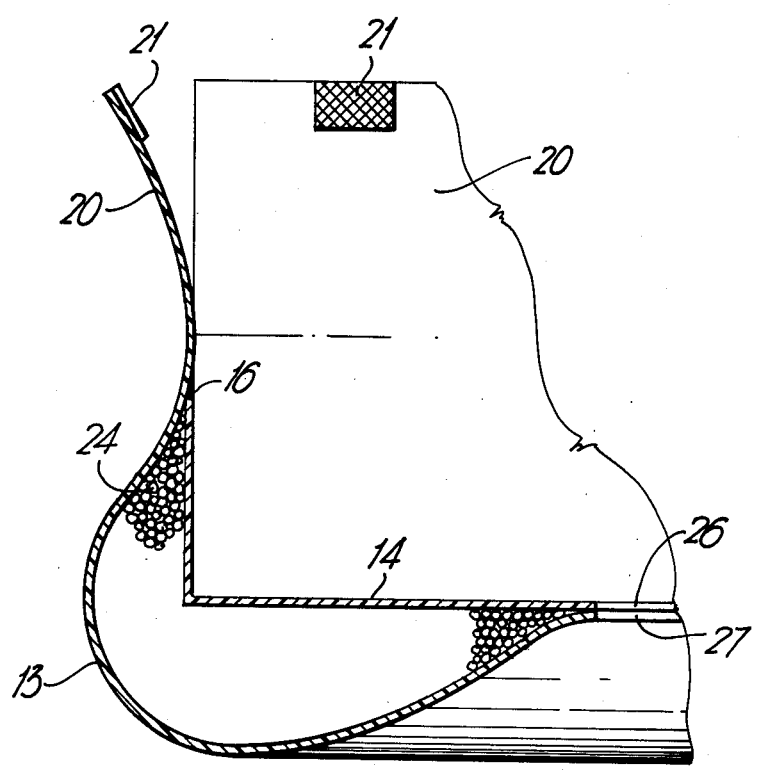
FIG. 2 is a cross-section on the line II—II of FIG. 1.

Considering first the bag 12, in conjunction with FIG. 2, there is an outer flexible skin 13 and an inner flexible skin 14. The outer skin 13 can readily be made from a rectangular piece of material having cut-outs at the corners, the edges of the cut-outs then being brought together and sewn together or, if of suitable material, welded or bonded together to form corners, as indicated at 15. The inner skin 14 can be similarly formed and is positioned inside the outer skin, being sewn, welded or bonded along the upper edge of the inner skin, as indicated at 16.

The depth of the box-like shape formed by the inner skin is made to be the same dimensions as the height of the side walls 17 of the housing 11. Thus, for the example illustrated in FIG. 1, in which the rear wall 18 of the housing is taller than the front wall, the inner skin 14 is made appropriately with a shorter front wall, a longer back wall and tapered side walls.

The outer skin 13 is joined at the corners 15 only to the height at which the inner skin extends. Above that height, the outer skin is in the form of four separate flaps 20. In the example illustrated two spaced pieces of material 21 are attached to the top edge of each flap on the inside. These pieces of material are one part of a two part "hooked and looped" pieces of material, such as the above mentioned Velcro. The flaps 20 also vary in length to match the variation in height of the side walls 17 of the housing 11.

Attached to the bottom edges of the side walls 17 of the housing 11, on the insides thereof, are further pieces of material 22, being the other part of the two part "hooked and looped" material. The pieces 22 are positioned to be engaged by the pieces 21.

Before final welding or otherwise attachment of the inner skin 14 to the outer skin 13, the space 23 between the two skins is filled with pellet material 24, to form a "bean bag" structure. The two skins are then sealed together. The housing 11 is pushed into the inner skin 14 and the flaps 20 folded over the tops of the sides 17 and pushed down inside. The pieces of material 21 are pressed into engagement with the pieces 22. The pellet material 24 can vary, a suitable one being polyethelene pellets. Typical materials for the bag member are denim, vinyl and corduroy.

Figure 3:
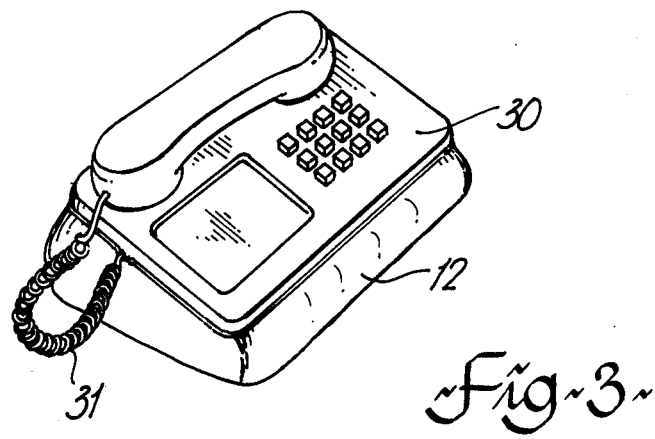
FIG. 3 is a perspective view of another form of telephone set with a base member attached.

The housing 11 is slotted at the corners, as indicated at 25. The housing is of a substantially rigid material, for example molded plastic, but has some flexibility. The slots 25 permit the sides 17 to spring or flex outwards when the telephone set base 10 is inserted into the assembled housing and bag. This ensures a tight fit on the telephone set base. The telephone is assembled prior to insertion in the housing 11 and may in fact be a telephone set in a subscriber's premises. To assemble, the line cord is passed through an aperture 26 in the base of the housing 11 and through an aperture 27 in the bottom of the bag. The inner and outer skins are fastened together round the periphery of the aperture 27. The telephone set is then pushed into the assembled housing and bag. Two trapped screws are in molded support members 28 on the inside surface of the base of the housing 11, and these screws are accessible through the aperture 27 and screw into holes in the telephone set base 10. An assembled telephone set, housing and bag is illustrated in FIG. 3. The height of the housing 11 is such that it just covers the joint line between the telephone set base 10 and the telephone set top 30. The handset cord 31 passes down between the bag 12 and the telephone set, passing through a slot 32 in the front wall of the housing 11 into the telephone set, for the example illustrated in FIG. 1 and through a similar slot in a side wall in the example illustrated in FIG. 3.

In the examples described and illustrated, the invention has been considered for a rectangular telephone set base. Other shapes and forms of telephone sets can be accommodated, for example round, or oval, by suitable shaping of the housing 11 and the bag 12.

What is claimed is:

1. A base member for attachment to a telephone set, comprising:
   a substantially rigid housing having a base and peripheral side walls adapted to closely fit over a base of the telephone set;
   a flexible bag comprising an outer flexible skin and an inner flexible skin, the skins attached together to form a bag portion having peripherally extending flaps, and pellet like material substantially filling said bag portion, the bag portion adapted to fit against the base of the housing, the peripheral flaps of the bag adapted to extend up said peripheral side walls of said housing and fold over said side walls and extend down inside said side walls;
   attachment means on said peripheral flaps of said bag portion and on the inner surfaces of said side walls of said housing for attachment of said bag to said housing.

2. A base member as claimed in claim 1, said peripheral side walls of said housing comprising a plurality of sections separated by slots extending down from upper edges of said side walls, whereby said sections can flex outwards on insertion of the telephone base.

3. A base member as claimed in claim 2, said housing of rectangular plan form, said slots at each corner of said housing.

4. A base member as claimed in claim 1, including an aperture at a central part of said bag portion and an aperture in said base of said housing, for passage of the telephone set line cord therethrough.

5. A base member as claimed in claim 4, including a slot in an upper part of one of said side walls of said housing for passage of the telephone set handset cord therethrough.

6. A base member as claimed in claim 1, said attachment means comprising a two part hooked and looped material, the hooked material on one of said flaps and said inner surfaces of said side walls and the looped material on the other of said flaps and said inner surfaces of said side walls.

7. A base member as claimed in claim 4, including fastening means for attaching said housing to said base of the telephone set, said fastening means accessible through said aperture in said bag portion.

8. A telephone set comprising:
a telephone set base;
a substantially rigid housing having a base and a peripheral side walls;
an enclosed flexible bag positioned against said base of said housing, said bag substantially filled with pellet like material, said bag including flaps extending up and over said side walls and down inner surfaces of said side walls and attached thereto;
said housing and said flexible bag enclosing said telephone set base, and fastening means extending through said base of said housing into said telephone set base and attaching said housing to said telephone set base.

9. A telephone set as claimed in claim 8, said side walls of said housing comprising a plurality of sections separated by slots extending from top edges of said side walls, whereby said sections flex outwards on insertion of said telephone set base into the assembled housing and flexible bag.

* * * * *